(12) United States Patent
Xu et al.

(10) Patent No.: US 10,063,078 B2
(45) Date of Patent: Aug. 28, 2018

(54) BUCK-BOOST BATTERY CHARGING CIRCUIT, CONTROL CIRCUIT AND ASSOCIATED CONTROL METHOD

(71) Applicant: Chengdu Monolithic Power Systems Co., Ltd., Chengdu (CN)

(72) Inventors: Min Xu, Hangzhou (CN); Qiming Zhao, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 63 days.

(21) Appl. No.: 15/387,635

(22) Filed: Dec. 21, 2016

(65) Prior Publication Data

US 2017/0187214 A1  Jun. 29, 2017

(30) Foreign Application Priority Data

Dec. 29, 2015 (CN) .......................... 2015 1 1002710

(51) Int. Cl.
*H02J 7/04* (2006.01)
*H02J 7/00* (2006.01)
*H02M 3/158* (2006.01)

(52) U.S. Cl.
CPC ............ *H02J 7/0052* (2013.01); *H02J 7/007* (2013.01); *H02J 7/0068* (2013.01); *H02M 3/1582* (2013.01)

(58) Field of Classification Search
CPC ........ H02J 7/0052; H02J 7/0068; H02J 7/007; H02M 3/1582

USPC ......................................................... 320/162
See application file for complete search history.

(56) References Cited

U.S. PATENT DOCUMENTS

| | | | |
|---|---|---|---|
| 6,055,168 A * | 4/2000 | Kotowski | H02M 3/07 307/110 |
| 8,963,514 B2 * | 2/2015 | Rehm | H02J 17/00 323/225 |
| 9,391,516 B2 | 7/2016 | Bai | |
| 9,431,845 B2 | 8/2016 | Xu | |
| 9,871,444 B2 * | 1/2018 | Ni | H02M 3/158 |
| 2015/0102787 A1 | 4/2015 | Xu | |
| 2015/0123480 A1 | 5/2015 | Xu | |
| 2015/0194826 A1 | 7/2015 | Xu | |
| 2016/0190926 A1 * | 6/2016 | Ni | H02M 3/158 323/271 |

* cited by examiner

*Primary Examiner* — M'Baye Diao
(74) *Attorney, Agent, or Firm* — Perkins Coie LLP (57) ABSTRACT

A battery charging circuit has a first switching circuit and a second switching circuit coupled in parallel between an input port and a node, a first switch coupled between the node and a system ground, a second switch coupled between the node and an output port, and a control circuit. When an input voltage is higher than a system voltage, the control circuit controls the first switching circuit and the second switching circuit turned ON and OFF with interleaving, the first switch maintains OFF and the second switch maintains ON. When the input voltage is lower than the system voltage, the control circuit controls the first switch and the second switch turned ON and OFF, and at least one of the first switching circuit and the second switching circuit maintains ON.

20 Claims, 9 Drawing Sheets

BUCK-BOOST BATTERY CHARGING CIRCUIT, CONTROL CIRCUIT AND ASSOCIATED CONTROL METHOD

CROSS-REFERENCE TO RELATED APPLICATION

This application claims the benefit of CN application No. 201511002710.9, filed on Dec. 29, 2015, and incorporated herein by reference.

TECHNICAL FIELD

The present invention relates to electrical circuit, more particularly but not exclusively relates to battery charging circuit.

BACKGROUND

With development of a portable electronic device, battery charging circuit is widely used in application of the portable electronic device. As increase of entertainment function of the portable electronic device, battery capacity becomes larger and larger to ensure enough navigation time. Subsequently, charge current is required higher and higher to achieve acceptable charge time for consumers. And in order to satisfy flexible input and output configuration, e.g., using adapters with different specifications to charge a battery, a novel battery charging circuit is needed.

SUMMARY

It is one of the objects of the present invention to provide a battery charging circuit, control circuit and associated control method to resolve one or more technical problems.

One embodiment of the present invention discloses a control circuit for a battery charging circuit, the battery charging circuit having an input port to receive an input voltage, an output port to provide a system voltage, a first switching circuit, a second switching circuit, a first switch and a second switch, wherein the first switching circuit and the second switching circuit are coupled in parallel between the input port and a first node, the first switch is coupled between the first node and a system ground, and the second switch is coupled between the first node and the output port, and the control circuit comprising: a plurality of feedback control loops, configured to provide a plurality of loop control signals, wherein each feedback control loop is configured to receive a reference signal, a feedback signal and a ramp signal, and provide a loop control signal based on the reference signal, the feedback signal and the ramp signal; a logic circuit, configured to receive the plurality of loop control signals and provide a logic signal; and a switching control module, coupled to the logic circuit to receive the logic signal, and configured to provide a first switching control signal to control the first switching circuit, a second switching control signal to control the second switching circuit, a third switching control signal to control the first switch, and a fourth switching control signal to control the second switch; wherein when the input voltage is higher than the system voltage, the first switching circuit and the second switching circuit are turned ON and OFF with interleaving based on the logic signal, the first switch maintains OFF, and the second switch maintains ON; and when the input voltage is lower than the system voltage, at least one of the first switching circuit and the second switching circuit maintains ON, and the first switch and the second switch are controlled based on the logic signal.

Another embodiment of the present invention discloses a battery charging circuit, comprising: an input port, configured to receive an input voltage; an output port, configured to provide a system voltage; a first switching circuit comprising a first switch and a second switch, the first switching circuit is coupled between the input port and a node; a second switching circuit comprising a third switch and a fourth switch, the second switching circuit is coupled in parallel with the first switching circuit between the input port and the node; a fifth switch, having a first terminal, a second terminal and a control terminal, wherein the first terminal is coupled to the node, and the second terminal is coupled to a system ground; a sixth switch, having a first terminal, a second terminal and a control terminal, wherein the first terminal is coupled to the node, the second terminal, and the second terminal is coupled to the output port; and a control circuit, configured to receive a plurality of feedback signals and provide a first switching control signal to control the first switching circuit, a second switching control signal to control the second switching circuit, a third switching control signal to the control terminal of the fifth switch, and a fourth switching control signal to the control terminal of the sixth switch; wherein when the input voltage is higher than the system voltage, the first switching circuit and the second switching circuit are controlled in response to the plurality of feedback signals, the fifth switch maintains OFF, and the sixth switch maintains ON; and when the input voltage is lower than the system voltage, at least one of the first switching circuit and the second switching circuit maintains ON, and the fifth switch and the sixth switch are controlled in response to the plurality of feedback signals.

Yet another embodiment of the present invention discloses a control method for a battery charging circuit, the battery charging circuit having an input port configured to receive an input voltage, an output port configured to provide a system voltage for charging a battery, a first switching circuit, a second switching circuit, a first switch and a second switch, wherein the first switching circuit and the second switching circuit are coupled in parallel between the input port and a node, the first switch is coupled between the node and a system ground, and the second switch is coupled between the node and the output port, the control method comprising: providing an input current loop control signal based on an input current feedback signal representative of an input current of the battery charging circuit, a ramp signal and an input current reference signal; providing a battery voltage loop control signal based on a battery voltage feedback signal representative of a battery voltage, the ramp signal and a battery voltage reference signal; providing a charging current loop control signal based on a charging current feedback signal representative of a battery charging current, the ramp signal and a charging current reference signal; providing a system voltage loop control signal based on a system voltage feedback signal representative of the system voltage, the ramp signal and a system voltage reference signal; providing a logic signal based on the input current loop control signal, the battery voltage loop control signal, the charging current loop control signal, and the system voltage loop control signal; providing a first time period control signal, a second time period control signal and a third time period control signal based on the input voltage and the system voltage; and providing a first switching control signal to control the first switching circuit, a second switching control signal to control the second switching circuit, a third switching control signal to control the first switch, and a fourth switching control signal to control the second switch; wherein when the input voltage is higher than the system voltage, the first switching circuit and the second switching circuit are controlled based on the logic signal, an OFF time period of the first switching circuit is adjusted based on the first time period control signal, and an OFF time period of the second switching circuit is adjusted based on the second time period control signal, the first switch maintains OFF, and the second switch maintains ON; and when the input voltage is lower than the system voltage, the first switch and the second switch are controlled based on the logic signal and the third time period control signal, and at least one of the first switching circuit and the second switching circuit maintains ON.

In one embodiment, the battery charging circuit can satisfy different specification of an input power supply and can provide a large charging current to charge a battery.

BRIEF DESCRIPTION OF THE DRAWINGS

Non-limiting and non-exhaustive embodiments are described with reference to the following drawings.

The use of the same reference label in different drawings indicates the same or like components.

DETAILED DESCRIPTION

In the present application, numerous specific details are provided, such as examples of circuits, components, and methods, to provide a thorough understanding of embodiments of the invention. These embodiments are exemplary, not to confine the scope of the invention. Persons of ordinary skill in the art will recognize, however, that the invention can be practiced without one or more of the specific details. In other instances, well-known details are not shown or described to avoid obscuring aspects of the invention. Some phrases are used in some exemplary embodiments. However, the usage of these phrases is not confined to these embodiments.

Several embodiments of the present invention are described below with reference to battery charging circuit and associated control circuit and control method.

Figure 1:
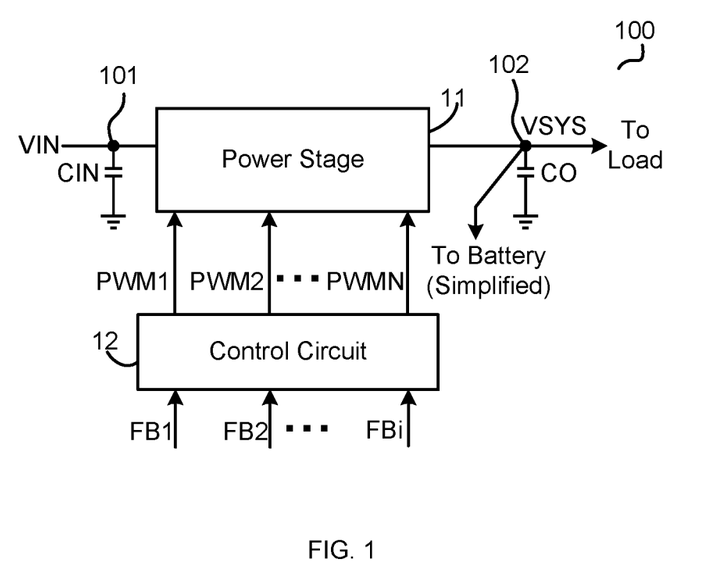
FIG. 1 schematically illustrates a circuit block diagram of a battery charging circuit 100 according to an embodiment of the present invention.

FIG. 1 schematically illustrates a circuit block diagram of a battery charging circuit 100 according to an embodiment of the present invention. In the embodiment shown in FIG. 1, battery charging circuit 100 has an input port 101 configured to receive an input voltage VIN, and an output port 102 configured to provide a system voltage VSYS. Battery charging circuit 100 comprises an input capacitor CIN coupled between input voltage VIN and a system ground, an output capacitor CO coupled between system voltage VSYS and the system ground, a power stage 11, and a control circuit 12. Power stage 11 comprises a plurality of switches. In one embodiment, power stage 11 comprises a plurality of switching circuits coupled in parallel, and each of the paralleled switching circuits has at least one switch. There is a phase shift between each of the paralleled switching circuits, so that the switching circuits are turned ON and turned OFF with interleaving. In one embodiment, power stage 11 can be configured either as a step-up (Boost) mode or as a step-down (Buck) mode. Control circuit 12 is configured to receive a plurality of feedback signals FB1, FB2 . . . FBi, and is configured to provide a plurality of switching control signals PWMA, PWMB . . . PWMN to control the plurality of switches in power stage 11 respectively. Feedback signals FB1, FB2 . . . FBi represent circuitry parameters of battery charging circuit 100, such as input voltage VIN, system voltage VSYS and so on.

Figure 2:
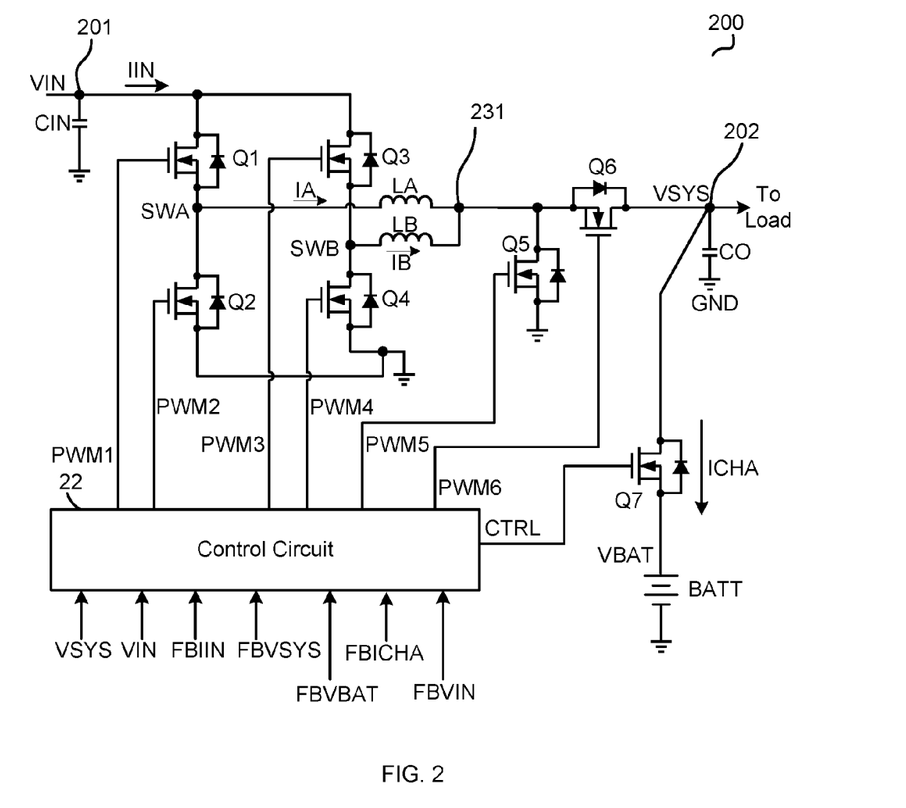
FIG. 2 schematically illustrates a circuit block diagram of a battery charging circuit 200 according to an embodiment of the present invention.

FIG. 2 schematically illustrates a circuit block diagram of a battery charging circuit 200 according to an embodiment of the present invention. Battery charging circuit 200 comprises a first switching circuit having a switch Q1, a switch Q2, and an inductor LA, a second switching circuit having a switch Q3, a switch Q4, and an inductor LB, a switch Q5, a switch Q6 and a control circuit 22. In the embodiment shown in FIG. 2, the first switching circuit and the second switching circuit are coupled in parallel between an input port 201 and a node 231. However, one of ordinary skill in the art should understand that battery charging circuit 200 may comprise more than two switching circuits coupled in parallel. A first terminal of switch Q1 and a first terminal of switch Q3 are coupled to input port 201 of battery charging circuit 200 to receive input voltage VIN, a second terminal of switch Q1 is coupled to a first terminal of switch Q2, a second terminal of switch Q2 is coupled to the system ground, a second terminal of switch Q3 is coupled to a first terminal of switch Q4, and a second terminal of switch Q4 is coupled to the system ground. A first terminal of inductor LA is coupled to a common node SWA of switch Q1 and switch Q2, a first terminal of inductor LB is coupled to a common node SWB of switch Q3 and switch Q4, and a second terminal of inductor LA and a second terminal of inductor LB are coupled to node 231. Switch Q5 has a first terminal coupled to node 231, and a second terminal coupled to the system ground. Switch Q6 has a first terminal coupled to the first terminal of switch Q5 at node 231, and a second terminal coupled to an output port 202 to provide system voltage VSYS across output capacitor CO. In one embodiment, switches Q1-Q6 are transistors, such as Metal Oxide Semiconductor Field Effect Transistor (MOSFET), Junction Field Effect Transistor (JFET), Bipolar Junction Transistor (BJT), and Insulated Gate Bipolar Transistor (IGBT). In the embodiment shown in FIG. 2, switches Q1-Q6 are MOSFET as one example. In another embodiment, switches Q2 and Q4 can be replaced by diodes. In the embodiment shown in FIG. 2, when input port 201 of battery charging circuit 200 connects to an input power supply to receive input voltage VIN, system voltage VSYS is configured to charge a battery BATT through a switch Q7. Otherwise, when input port 201 of battery charging circuit 200 disconnects from the input power supply, battery BATT is configured to provide system voltage VSYS at output port 202 through switch Q7.

Control circuit 22 is configured to receive a plurality of feedback signals, such as an input current feedback signal FBIIN representative of an input current IIN of battery charging circuit 200, a system voltage feedback signal FBVSYS representative of system voltage VSYS, a battery voltage feedback signal FBVBAT representative of a battery voltage VBAT, a charging current feedback signal FBICHA representative of a battery charging current ICHA, and an input voltage feedback signal FBVIN representative of input voltage VIN. Based on the plurality of feedback signals, control circuit 22 is configured to provide switching control signals PWM1-PWM6 to control switches Q1-Q6 respectively. Control circuit 22 is further configured to provide a switching control signal CTRL to control switch Q7. The plurality of feedback signals are not limited to the embodiment shown in FIG. 2, feedback signals representative of other circuitry parameters may also be received by control circuit 22, such as a feedback signal representative of a circuit temperature. In one embodiment, when any fault happens on battery charging circuit 200 or on battery BATT, control circuit 22 is configured to provide switching control signal CTRL to turn OFF switch Q7.

Based on input voltage VIN and system voltage VSYS, control circuit 22 is configured to control battery charging circuit 200 working at the step-up mode or the step-down mode. When input voltage VIN is higher than system voltage VSYS, battery charging circuit 200 works at the step-down mode, that is control circuit 22 is configured to provide switching control signals PWM1-PWM4 based on the plurality of feedback signals to control the first switching circuit and the second switching circuit, and control circuit 22 is configured to provide low voltage level switching control signal PWM5 to turn OFF switch Q5 and provide high voltage level switching control signal PWM6 to turn ON switch Q6. When input voltage VIN is lower than system voltage VSYS, battery charging circuit 200 works at the step-up mode, that is control circuit 22 is configured to provide switching control signals PWM5 and PWM6 based on the plurality of feedback signals to control switch Q5 and switch Q6, and control circuit 22 is configured to provide high voltage level switching control signal PWM1 to turn ON the first switching circuit, and/or high voltage level switching control signal PWM3 to turn ON the second switching circuit. In one embodiment, switch Q1 and switch Q2 are turned ON complementary, and turn ON the first switching circuit means that switch Q1 is turned ON and switch Q2 is turned OFF. In one embodiment, switch Q3 and switch Q4 are turned ON complementary, and turn ON the second switching circuit means that switch Q3 is turned ON and switch Q4 is turned OFF.

Figure 3:
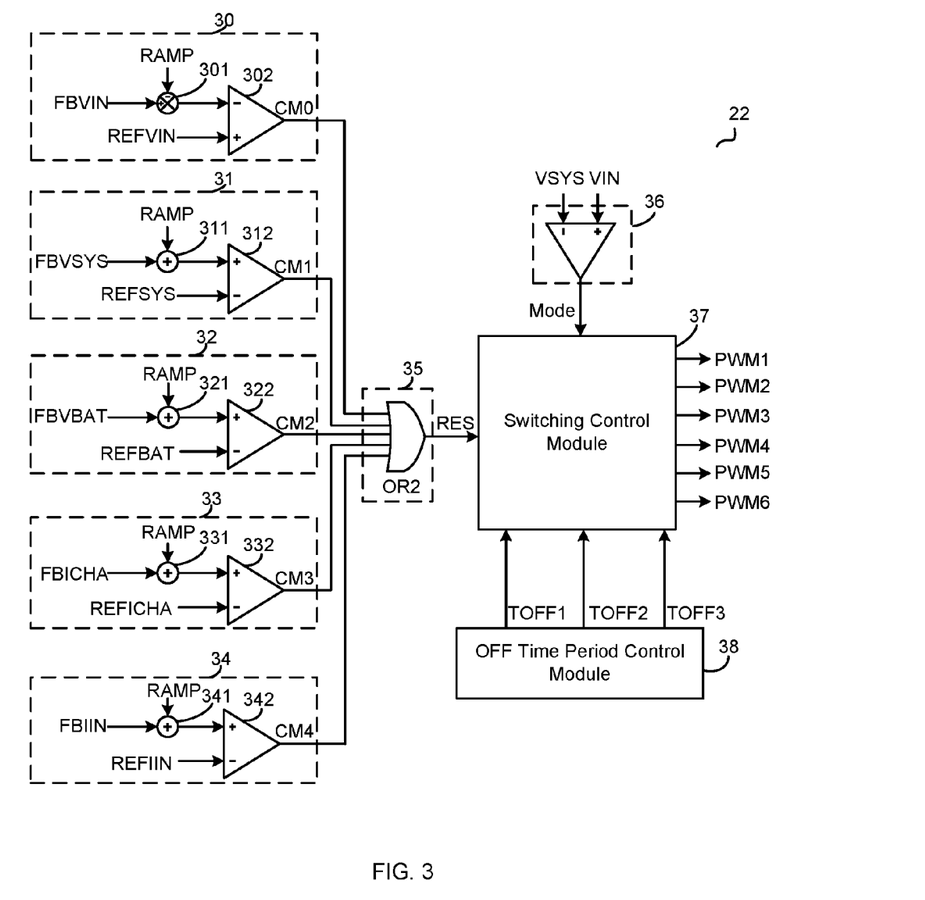
FIG. 3 schematically illustrates a control circuit 22 of battery charging circuit 200 shown in FIG. 2 according to an embodiment of the present invention.

FIG. 3 schematically illustrates a control circuit 22 of battery charging circuit 200 shown in FIG. 2 according to an embodiment of the present invention. control circuit 22 comprises a plurality of feedback control loops 30-34, a logic circuit 35, a comparison circuit 36, a switching control module 37, and an OFF time period control module 38.

Each of feedback control loops 30-34 is configured to receive a feedback signal, a ramp signal RAMP, and a reference signal, and is configured to provide a loop control signal. In one embodiment, each of feedback control loops 30-34 comprises an operating circuit and a comparison circuit, the operating circuit is configured to provide an operating signal based on the feedback signal and ramp signal RAMP, and the comparison circuit is configured to provide the loop control signal via comparing the operating signal with the reference signal. In the embodiment shown in FIG. 3, feedback control loop 30 is an input voltage control loop, which is configured to provide an input voltage loop control signal CM0 via comparing a subtraction between input voltage feedback signal FBVIN and ramp signal RAMP (FBVIN−RAMP) with an input voltage reference signal REFVIN. Feedback control loop 30 comprises an operating circuit 301 and a comparison circuit 302. Operating circuit 301 is configured to receive input voltage feedback signal FBVIN and ramp signal RAMP, and is configured to provide an operating signal FBVIN−RAMP. Comparison circuit 302 comprises an inverting terminal coupled to operating circuit 301 to receive operating signal FBVIN−RAMP, a non-inverting terminal configured to receive input voltage reference signal REFVIN, and an output terminal configured to provide input voltage loop control signal CM0. Feedback control loop 31 is a system voltage control loop, which is configured to provide a system voltage loop control signal CM1 via comparing a summation of system voltage feedback signal FBVSYS and ramp signal RAMP (FBVSYS+RAMP) with a system voltage reference signal REFSYS. Feedback control loop 31 comprises an operating circuit 311 and a comparison circuit 312. Operating circuit 311 is configured to receive system voltage feedback signal FBVSYS and ramp signal RAMP, and is configured to provide an operating signal FBVSYS+RAMP. Comparison circuit 312 comprises a non-inverting terminal coupled to operating circuit 311 to receive operating signal FBVSYS+RAMP, an inverting terminal configured to receive system voltage reference signal REFSYS, and an output terminal configured to provide system voltage loop control signal CM1. Feedback control loop 32 is a battery voltage control loop, which is configured to provide a battery voltage loop control signal CM2 via comparing a summation of battery voltage feedback signal FBVBAT and ramp signal RAMP (FBVBAT+RAMP) with a battery voltage reference signal REFBAT. Feedback control loop 32 comprises an operating circuit 321 and a comparison circuit 322. Operating circuit 321 is configured to receive battery voltage feedback signal FBVBAT and ramp signal RAMP, and is configured to provide an operating signal FBVSYS+RAMP. Comparison circuit 322 comprises a non-inverting terminal coupled to operating circuit 321 to receive operating signal FBVBAT+RAMP, an inverting terminal configured to receive battery voltage reference signal REFBAT, and an output terminal configured to provide battery voltage loop control signal CM2. Feedback control loop 33 is a charging current control loop, which is configured to provide a charging current loop control signal CM3 via comparing a summation of charging current feedback signal FBICHA and ramp signal RAMP (FBICHA+RAMP) with a charging current reference signal REFICHA. Feedback control loop 33 comprises an operating circuit 331 and a comparison circuit 332. Operating circuit 331 is configured to receive charging current feedback signal FBICHA and ramp signal RAMP, and is configured to provide an operating signal FBICHA+RAMP. Comparison circuit 332 comprises a non-inverting terminal coupled to operating circuit 331 to receive operating signal FBICHA+RAMP, an inverting terminal configured to receive charging current reference signal REFICHA, and an output terminal configured to provide charging current loop control signal CM3. Feedback control loop 34 is an input current control loop, which is configured to provide an input current loop control signal CM4 via comparing a summation of input current feedback signal FBIIN and ramp signal RAMP (FBIIN+RAMP) with an input current reference signal REFIIN. Feedback control loop 34 comprises an operating circuit 341 and a comparison circuit 342. Operating circuit 341 is configured to receive input current feedback signal FBIIN and ramp signal RAMP, and is configured to provide an operating signal FBIIN+RAMP. Comparison circuit 342 comprises a non-inverting terminal coupled to operating circuit 341 to receive operating signal FBIIN+RAMP, an inverting terminal configured to receive input current reference signal REFIIN, and an output terminal configured to provide input current loop control signal CM4.

Logic circuit 35 is coupled to feedback control loops 30-34 to receive loop control signals CM0-CM4, and logic circuit 35 is configured to provide a logic signal RES. In the embodiment shown in FIG. 3, logic circuit 35 comprises an OR gate OR2. OR gate OR2 comprises four input terminals configured to receive loop control signals CM0-CM4 respectively, and an output terminal configured to provide logic signal RES. In one embodiment, logic signal RES's status varies in response to any change of loop control signals CM0-CM4, e.g., logic signal RES becomes high voltage level when any of loop control signals CM0-CM4 becomes high voltage level. Comparison circuit 36 has a non-inverting terminal configured to receive input voltage VIN, an inverting terminal configured to receive system voltage VSYS, and an output terminal configured to provide a mode control signal Mode via comparing input voltage VIN with system voltage VSYS. When input voltage VIN is higher than system voltage VSYS, mode control signal Mode becomes high voltage level, switching control module 37 is configured to control battery charging circuit 200 working at the step-down mode. When input voltage VIN is lower than system voltage VSYS, mode control signal Mode becomes low voltage level, switching control module 37 is configured to control battery charging circuit working at the step-up mode. OFF time period control module 38 is configured to provide time period control signals TOFF1-TOFF3. Switching control module 37 is coupled to logic circuit 35 to receive logic signal RES, coupled to comparison circuit 36 to receive mode control signal Mode, coupled to OFF time period control module 38 to receive time period control signals TOFF1-TOFF3, and is configured to provide switching control signals PWM1-PWM6 based on mode control signal Mode, logic signal RES, and time period control signals TOFF1-TOFF3.

Figure 4:
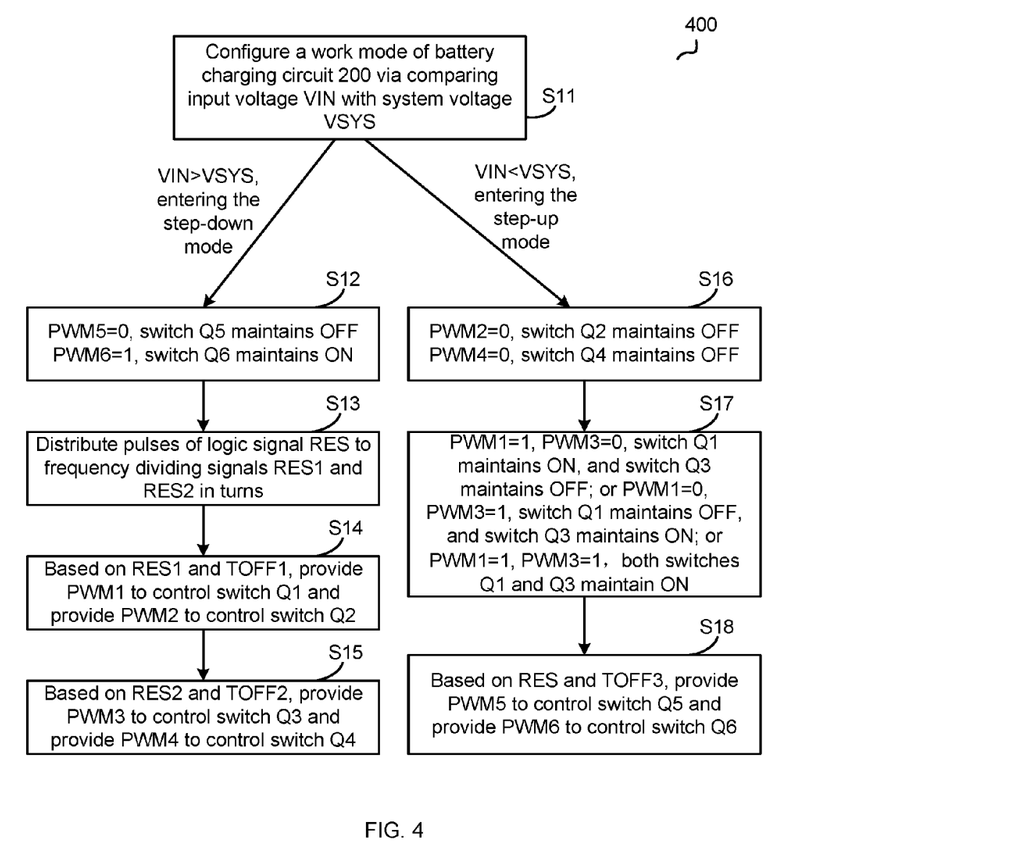
FIG. 4 shows a flow chart 400 of control circuit 22 shown in FIG. 3 according to an embodiment of the present invention.

FIG. 4 shows a flow chart 400 of control circuit 22 shown in FIG. 3 according to an embodiment of the present invention. Flow chart 400 comprises steps S11-S18.

At step S11, configure a work mode of battery charging circuit 200 via comparing input voltage VIN with system voltage VSYS. When input voltage VIN is higher than system voltage VSYS, battery charging circuit 200 enters the step-down mode at steps S12-S15. When input voltage VIN is lower than system voltage VSYS, battery charging circuit 200 enters the step-up mode at steps S16-S18.

At step S12, provide low voltage level switching control signal PWM5 to control switch Q5 maintaining OFF, and provide high voltage level switching control signal PWM6 to control switch Q6 maintaining ON.

At step S13, distribute pulses of logic signal RES to frequency dividing signals RES1 and RES2 in turns. For example, distribute a first pulse of logic signal RES to frequency dividing signal RES1, distribute a second pulse of logic signal RES to frequency dividing signal RES2, distribute a third pulse of logic signal RES to frequency dividing signal RES1, distribute a fourth pulse of logic signal RES to frequency dividing signal RES2, and so on.

At step S14, based on frequency dividing signal RES1 and time period control signal TOFF1, provide switching control signal PWM1 to control switch Q1 and provide switching control signal PWM2 to control switch Q2.

At step S15, based on frequency dividing signal RES2 and time period control signal TOFF2, provide switching control signal PWM3 to control switch Q3 and provide switching control signal PWM4 to control switch Q4.

At step S16, provide low voltage level switching control signal PWM2 to control switch Q2 maintaining OFF, and provide low voltage level switching control signal PWM4 to control switch Q4 maintaining OFF.

At step S17, provide high voltage level switching control signal PWM1 and/or high voltage level switching control signal PWM3 to control at least one of the first switching circuit and the second switching circuit maintaining ON, i.e., to control at least one of switches Q1 and Q3 maintaining ON. For example, provide high voltage level switching control signal PWM1 and low voltage level switching control signal PWM3 to control switch Q1 maintaining ON and switch Q3 maintaining OFF, provide low voltage level switching control signal PWM1 and high voltage level switching control signal PWM3 to control switch Q1 maintaining OFF and switch Q3 maintaining ON, or provide high voltage level switching control signal PWM1 and high voltage level switching control signal PWM3 to control both switch Q1 and switch Q3 maintaining ON.

At step S18, based on logic signal RES and time period control signal TOFF3, provide switching control signal PWM5 to control switch Q5, and provide switching control signal PWM6 to control switch Q6.

Figure 5:
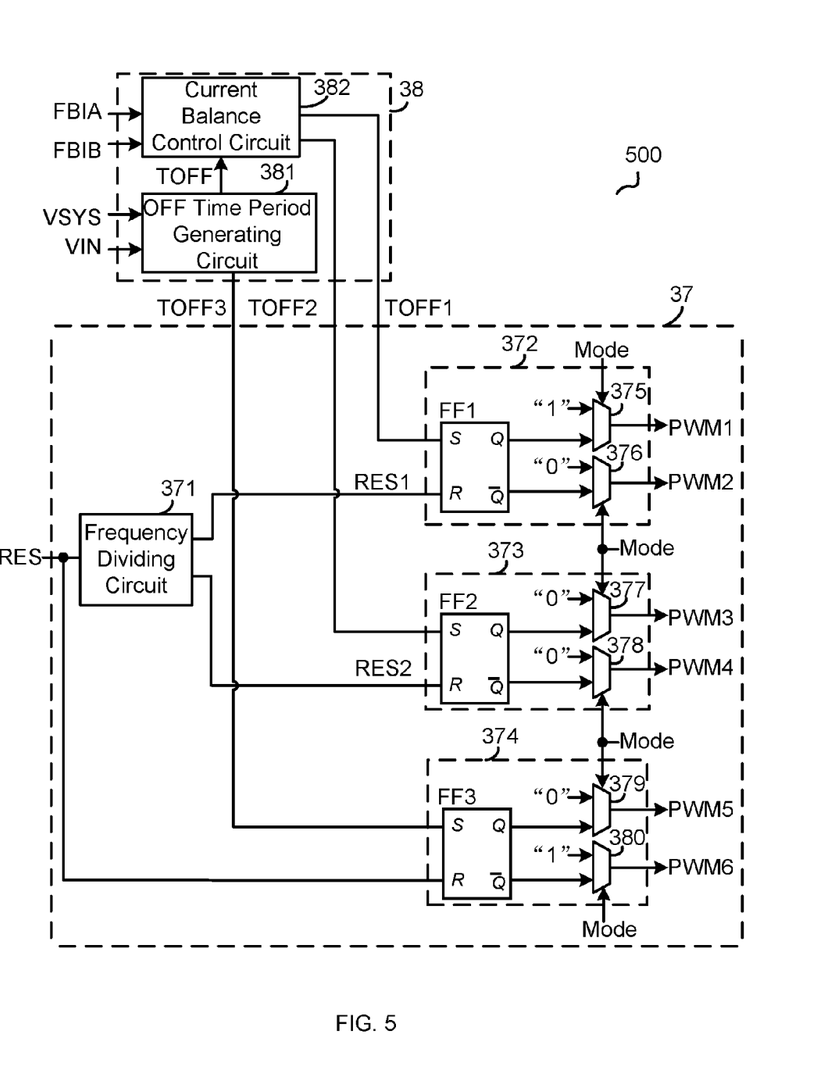
FIG. 5 schematically illustrates a switching control module 37 and an OFF time period control module 38 of control circuit 22 shown in FIG. 3 according to an embodiment of the present invention.

FIG. 5 schematically illustrates a switching control module 37 and an OFF time period control module 38 of control circuit 22 shown in FIG. 3 according to an embodiment of the present invention.

Switching control module 37 comprises a frequency dividing circuit 371, a logic circuit 372, a logic circuit 373, and a logic circuit 374. Frequency dividing circuit 371 is configured to receive logic signal RES, and provide frequency dividing signals RES1 and RES2 via dividing frequency of logic signal RES. In one embodiment, pulses of logic signal RES is distributed into frequency dividing signals RES1 and RES2 in turns.

Logic circuit 372 is configured to receive frequency dividing signal RES1, mode control signal Mode and time period control signal TOFF1, and provide switching control signals PWM1 and PWM2. When mode control signal Mode is high voltage level, switching control signals PWM1 and PWM2 are provided based on frequency dividing signal RES1 and time period control signal TOFF1. In one embodiment, switching control signal PWM1 and switching control signal PWM2 are complementary and non-overlapping, so that switch Q1 and switch Q2 are turned ON complementarily when mode control signal Mode is high voltage level. When mode control signal Mode is low voltage level, switching control signal PWM1 is high voltage level to turn ON switch Q1, and switching control signal PWM2 is low voltage level to turn OFF switch Q2. Logic circuit 373 is configured to receive frequency dividing signal RES2, mode control signal Mode and time period control signal TOFF2, and provide switching control signals PWM3 and PWM4.

When mode control signal Mode is high voltage level, switching control signals PWM3 and PWM4 are provided based on frequency dividing signal RES2 and time period control signal TOFF2. In one embodiment, switching control signal PWM3 and switching control signal PWM4 are complementary and non-overlapping, so that switch Q3 and switch Q4 are turned ON complementarily when mode control signal Mode is high voltage level. When mode control signal Mode is low voltage level, switching control signal PWM3 is low voltage level to turn OFF switch Q3, and switching control signal PWM4 is low voltage level to turn OFF switch Q4. In the embodiment shown in FIG. 5, logic circuit 372 comprises a RS flip-flop FF1, a multiplexer 375, and a multiplexer 376. RS flip-flop FF1 comprises a set terminal S configured to receive time period control signal TOFF1, a reset terminal R configured to receive frequency dividing signal RES1, and a non-inverting output terminal Q, an inverting output terminal /Q. Multiplexer 375 comprises a first input terminal coupled to a high level voltage, i.e., "1", a second input terminal coupled to non-inverting output terminal Q of RS flip-flop FF1, a control terminal configured to receive mode control signal Mode, and an output terminal configured to provide switching control signal PWM1. When mode control signal Mode is high voltage level, multiplexer 375 provides switching control signal PWM1 based on a signal at non-inverting output terminal Q of RS flip-flop FF1; and when mode control signal Mode is low voltage level, multiplexer 375 provides switching control signal PWM1 with high voltage level. Multiplexer 376 comprises a first input terminal coupled to a low level voltage, i.e., "0", a second input terminal coupled to inverting output terminal /Q of RS flip-flop FF1, a control terminal configured to receive mode control signal Mode, and an output terminal configured to provide switching control signal PWM2. When mode control signal Mode is high voltage level, multiplexer 376 provides switching control signal PWM2 based on a signal at inverting output terminal /Q of RS flip-flop FF1; and when mode control signal Mode is low voltage level, multiplexer 376 provides switching control signal PWM2 with low voltage level. In the embodiment shown in FIG. 5, logic circuit 373 comprises a RS flip-flop FF2, a multiplexer 377 and a multiplexer 378. RS flip-flop FF2 comprises a set terminal S configured to receive time period control signal TOFF2, a reset terminal R configured to receive frequency dividing signal RES2, and a non-inverting output terminal Q, an inverting output terminal /Q. Multiplexer 377 comprises a first input terminal coupled to the low level voltage, i.e., "0", a second input terminal coupled to non-inverting output terminal Q of RS flip-flop FF2, a control terminal configured to receive mode control signal Mode, and an output terminal configured to provide switching control signal PWM3. When mode control signal Mode is high voltage level, multiplexer 377 provides switching control signal PWM3 based on a signal at non-inverting output terminal Q of RS flip-flop FF2; and when mode control signal Mode is low voltage level, multiplexer 377 provides switching control signal PWM3 with low voltage level. Multiplexer 378 comprises a first input terminal coupled to the low level voltage, i.e., "0", a second input terminal coupled to inverting output terminal /Q of RS flip-flop FF2, a control terminal configured to receive mode control signal Mode, and an output terminal configured to provide switching control signal PWM4. When mode control signal Mode is high voltage level, multiplexer 378 provides switching control signal PWM4 based on a signal at inverting output terminal /Q of RS flip-flop FF2; and when mode control signal Mode is low voltage level, multiplexer 378 provides switching control signal PWM4 with low voltage level. Logic circuit 374 is configured to receive logic signal RES, mode control signal Mode and time period control signal TOFF3, and provide switching control signals PWM5 and PWM6. When mode control signal Mode is low voltage level, logic circuit 374 is configured to provide switching control signals PWM5 and PWM6 based on logic signal RES and time period control signal TOFF3. In one embodiment, switching control signal PWM5 and switching control signal PWM6 are complementary and non-overlapping, so that switch Q5 and switch Q6 are turned ON complementarily when mode control signal Mode is low voltage level. When mode control signal Mode is high voltage level, switching control signal PWM5 is low voltage level to turn OFF switch Q5, and switching control signal PWM6 is high voltage level to turn ON switch Q6. In the embodiment shown in FIG. 5, logic circuit 374 comprises a RS flip-flop FF3, a multiplexer 379, and a multiplexer 380. RS flip-flop FF3 comprises a set terminal S configured to receive time period control signal TOFF3, a reset terminal R configured to receive logic signal RES, and a non-inverting output terminal Q, an inverting output terminal /Q. Multiplexer 379 comprises a first input terminal coupled to the low level voltage, i.e., "0", a second input terminal coupled to non-inverting output terminal Q of RS flip-flop FF3, a control terminal configured to receive mode control signal Mode, and an output terminal configured to provide switching control signal PWM5. When mode control signal Mode is low voltage level, multiplexer 379 provides switching control signal PWM5 based on a signal at non-inverting output terminal Q of RS flip-flop FF3; and when mode control signal Mode is high voltage level, multiplexer 379 provides switching control signal PWM5 with low voltage level. Multiplexer 380 comprises a first input terminal coupled to the high level voltage, i.e., "1", a second input terminal coupled to inverting output terminal /Q of RS flip-flop FF3, a control terminal configured to receive mode control signal Mode, and an output terminal configured to provide switching control signal PWM6. When mode control signal Mode is low voltage level, multiplexer 380 provides switching control signal PWM5 based on a signal at inverting output terminal /Q of RS flip-flop FF3; and when mode control signal Mode is high voltage level, multiplexer 380 provides switching control signal PWM6 with high voltage level.

In the embodiment shown in FIG. 5, when battery charging circuit 200 works at the step-up mode, switch Q1 maintains ON and switch Q3 maintains OFF. However, one with ordinary skill in the art should understand that when battery charging circuit works at the step-up mode, switch Q1 may maintain OFF and switch Q3 may maintain ON, or both of switches Q1 and Q3 may maintain ON.

Continuing with FIG. 5, OFF time period control module 38 is configured to provide time period control signals TOFF1-TOFF3. In one embodiment, time period control signal TOFF1 is configured to control an OFF time period of switch Q1 in response to a time period TA, time period control signal TOFF2 is configured to control an OFF time period of switch Q3 in response to a time period TB, and time period control signal TOFF3 is configured to control an OFF time period of switch Q5 in response to a time period TC, where time periods TA, TB and TC may be set by a program or a circuit. In another embodiment, time period control signal TOFF1 may be provided in response to an expected switching period of switch Q1, time period control signal TOFF2 may be provided in response to an expected switching period of switch Q3, and time period control signal TOFF3 may be provided in response to an expected switching period of switch Q5. In one embodiment, when battery charging circuit 200 works, time period control signals TOFF1 and TOFF2 are adjusted in response to circuitry parameters, such as input voltage VIN, system voltage VSYS, a current IA flowing through the first switching circuit, and/or a current IB flowing through the second switching circuit, so that the OFF time period of switch Q1 and the OFF time period of switch Q3 are real time adjusted.

In the embodiment shown in FIG. 5, OFF time period control module 38 comprises an OFF time period generating circuit 381 and a current balance control circuit 382. OFF time period generating circuit 381 is configured to provide time period control signal TOFF3 to control the OFF time period of switch Q5 equaling a first preset time period at the step-up mode based on system voltage VSYS and input voltage VIN. For example, the OFF time period of switch Q5 equals:

$$k1*VIN/VSYS \quad (1)$$

Where, k1 represents the expected switching period of switch Q5, and k1*VIN/VSYS is the first preset time period.

OFF time period generating circuit 381 is configured to provide an OFF time period control signal TOFF to control the OFF time period of switch Q1 and the OFF time period of switch Q3 equaling a second preset time period at sep-down mode based on system voltage VSYS and input voltage VIN. For example, the OFF time period of switch Q1 and the OFF time period of switch Q3 equal:

$$(1-VSYS/VIN)*k2 \quad (2)$$

Where, k2 represents the expected switching period of switch Q1 and switch Q3, (1−VSYS/VIN)*k2 is the second preset time period.

In one embodiment, based on OFF time period control signal TOFF, current IA and current IB, current balance control circuit 382 is configured to provide time period control signal TOFF1 and time period control signal TOFF2 to adjust the OFF time period of switch Q1 and the OFF time period of switch Q3 at the step-down mode to achieve current balance between the first switching circuit and the second switching circuit, as a result, current IA will equal current IB. In the embodiment shown in FIG. 5, current balance control circuit 382 is configured to receive a current feedback signal FBIA representative of current IA and a current feedback signal FBIB representative of current IB, and configured to provide time period control signal TOFF1 and time period control signal TOFF2. In one embodiment, when current IA minus current IB (IA−IB) is larger than a predetermined value, time period control signal TOFF1 is adjusted to extend the OFF time period of switch Q1, time period control signal TOFF2 is adjusted to shorten the OFF time period of switch Q3. When current IB minus current IA (IB−IA) is larger than the predetermined value, time period control signal TOFF1 is adjusted to shorten the OFF time period of switch Q1, and time period control signal TOFF2 is adjusted to extend the OFF time period of switch Q3.

In one embodiment, when power stage 21 has more than two switching circuits coupled in parallel between input port 201 and node 231, a current balance control loop takes an average value of current flowing through all of the switching circuits as a reference, and is configured to adjust an OFF time period of corresponding switching circuit via comparing a current flowing through corresponding switching circuit with the reference.

Figure 6:
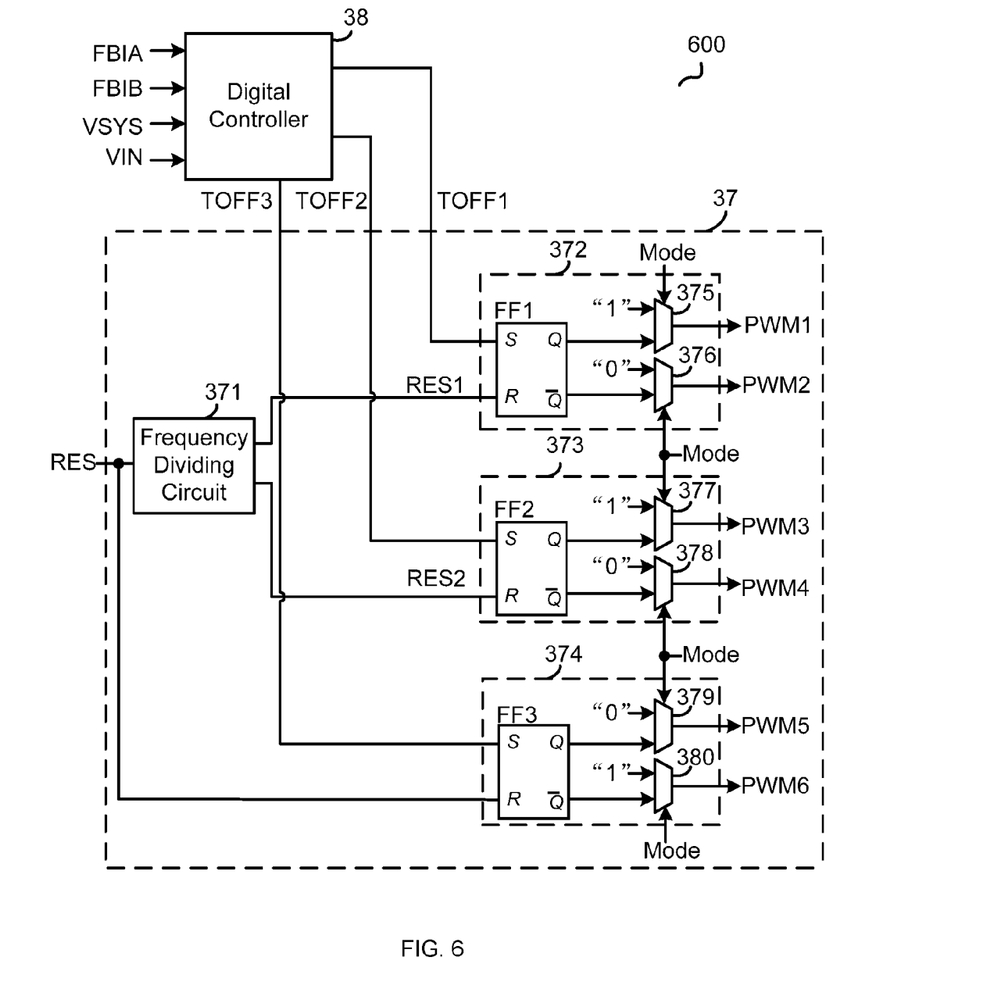
FIG. 6 schematically illustrates a switching control module 37 and an OFF time period control module 38 of control circuit 22 shown in FIG. 3 according to another embodiment of the present invention.

FIG. 6 schematically illustrates a switching control module 37 and an OFF time period control module 38 of control circuit 22 shown in FIG. 3 according to another embodiment of the present invention. In the embodiment shown in FIG. 6, when mode control signal Mode is low voltage level, both of the first switching circuit and the second switching circuit maintain ON, that is both of switching control signal PWM1 and switching control signal PWM3 are high voltage level to maintain switch Q1 and switch Q3 ON. In the embodiment shown in FIG. 6, OFF time period control mode 38 is implemented by a digital controller.

Figure 7:
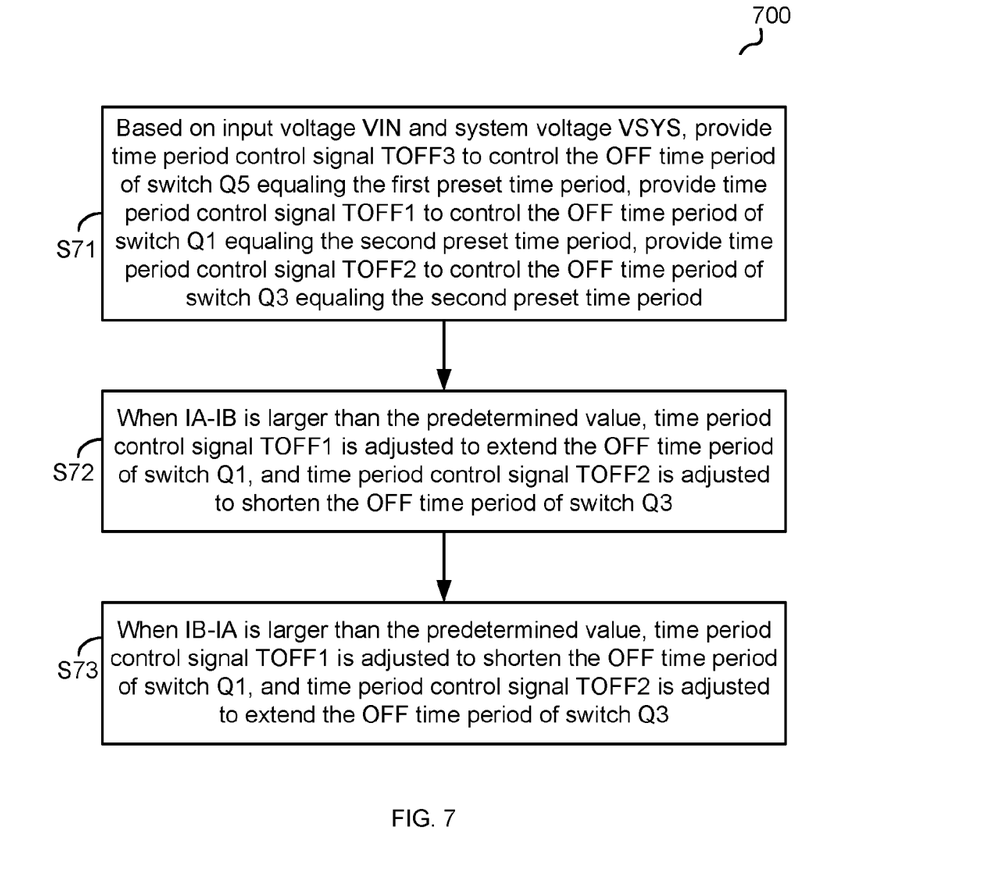
FIG. 7 shows a flow chart 700 of a digital controller shown in FIG. 6 according to an embodiment of the present invention.

FIG. 7 shows a flow chart 700 of the digital controller shown in FIG. 6 according to an embodiment of the present invention. Flow chart 700 comprises steps S71-S73. At step S71, based on input voltage VIN and system voltage VSYS, provide time period control signal TOFF3 to control the OFF time period of switch Q5 equaling the first preset time period k1*VIN/VSYS, provide time period control signal TOFF1 to control the OFF time period of switch Q1 equaling the second preset time period (1−VSYS/VIN)*k2, and provide time period control signal TOFF2 to control the OFF time period of switch Q2 equaling the second preset time period (1−VSYS/VIN)*k2. At step S72, when current IA minus current IB (IA−IB) is larger than the predetermined value, time period control signal TOFF1 is adjusted to extend the OFF time period of switch Q1, and time period control signal TOFF2 is adjusted to shorten the OFF time period of switch Q3. At step S73, when current IB minus current IA (IB−IA) is larger than the predetermined value, time period control signal TOFF1 is adjusted to shorten the OFF time period of switch Q1, and time period control signal TOFF2 is adjusted to extend the OFF time period of switch Q3.

Figure 8:
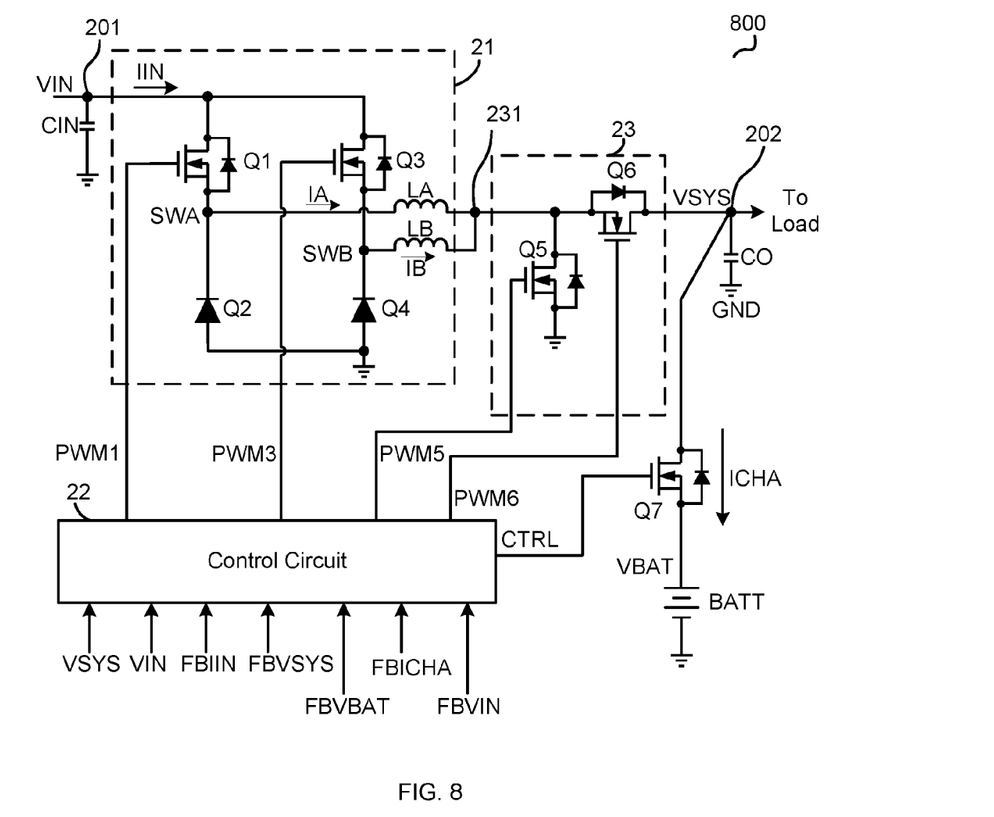
FIG. 8 schematically illustrates a circuit block diagram of a battery charging circuit 800 according to an embodiment of the present invention.

FIG. 8 schematically illustrates a circuit block diagram of a battery charging circuit 800 according to an embodiment of the present invention. The differences between battery charging circuit 800 and battery charging circuit 200 are that switches Q2 and Q4 are diodes in battery charging circuit 800.

Figure 9:
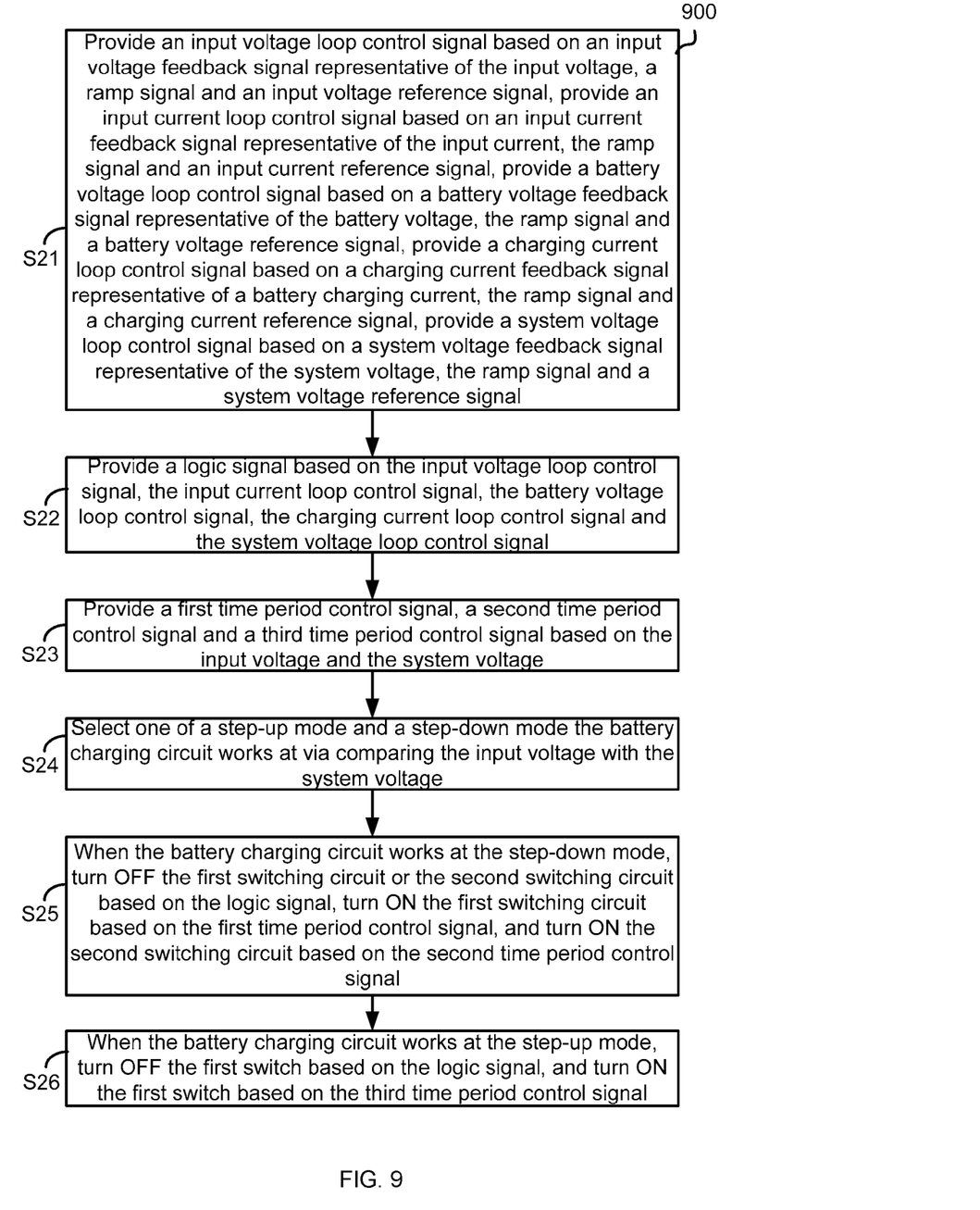
FIG. 9 shows a flow chart 900 illustrating a control method for a battery charging circuit according to an embodiment of the present invention.

FIG. 9 shows a flow chart 900 illustrating a control method for a battery charging circuit according to an embodiment of the present invention. The battery charging circuit comprises an input port, an output port, a first switching circuit and a second switching circuit coupled in parallel between the input port and a node. The battery charging circuit further comprises a first switch coupled between the node and a system ground, and a second switch coupled between the node and the output port. Flow chart 900 comprises steps S21-S26.

At step S21, provide an input voltage loop control signal based on an input voltage feedback signal representative of the input voltage, a ramp signal and an input voltage reference signal, provide an input current loop control signal based on an input current feedback signal representative of the input current, the ramp signal and an input current reference signal, provide a battery voltage loop control signal based on a battery voltage feedback signal representative of the battery voltage, the ramp signal and a battery voltage reference signal, provide a charging current loop control signal based on a charging current feedback signal representative of a battery charging current, the ramp signal and a charging current reference signal, provide a system voltage loop control signal based on a system voltage feedback signal representative of the system voltage, the ramp signal and a system voltage reference signal.

At step S22, provide a logic signal based on the input voltage loop control signal, the input current loop control signal, the battery voltage loop control signal, the charging current loop control signal and the system voltage loop control signal.

At step S23, provide a first time period control signal, a second time period control signal and a third time period control signal based on the input voltage and the system voltage.

At step S24, select one of a step-up mode and a step-down mode the battery charging circuit works at via comparing the input voltage with the system voltage.

At step S25, when the battery charging circuit works at the step-down mode, turn OFF the first switching circuit or the second switching circuit based on the logic signal, turn ON the first switching circuit based on the first time period control signal, and turn ON the second switching circuit based on the second time period control signal.

At step S26, when the battery charging circuit works at the step-up mode, turn OFF the first switch based on the logic signal, and turn ON the first switch based on the third time period control signal.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. A control circuit for a battery charging circuit, the battery charging circuit having an input port to receive an input voltage, an output port to provide a system voltage, a first switching circuit, a second switching circuit, a first switch and a second switch, wherein the first switching circuit and the second switching circuit are coupled in parallel between the input port and a node, the first switch is coupled between the node and a system ground, and the second switch is coupled between the node and the output port, and the control circuit comprising:
   a plurality of feedback control loops, configured to provide a plurality of loop control signals, wherein each feedback control loop is configured to receive a reference signal, a feedback signal and a ramp signal, and provide a loop control signal based on the reference signal, the feedback signal and the ramp signal;
   a logic circuit, configured to receive the plurality of loop control signals and provide a logic signal;
   a switching control module, coupled to the logic circuit to receive the logic signal, and configured to provide a first switching control signal to control the first switching circuit, a second switching control signal to control the second switching circuit, a third switching control signal to control the first switch, and a fourth switching control signal to control the second switch; wherein
   when the input voltage is higher than the system voltage, the first switching circuit and the second switching circuit are turned ON and OFF with interleaving based on the logic signal, the first switch maintains OFF, and the second switch maintains ON; and
   when the input voltage is lower than the system voltage, at least one of the first switching circuit and the second switching circuit maintains ON, and the first switch and the second switch are controlled based on the logic signal.

2. The control circuit of claim 1, further comprising:
   a first comparison circuit, having a first input terminal, a second input terminal and an output terminal, wherein the first input terminal is configured to receive the input voltage, the second input terminal is configured to receive the system voltage, and the output terminal is configured to provide a mode control signal via comparing the input voltage with the system voltage; and
   an OFF time period control module, configured to provide a first time period control signal, a second time period control signal, and a third time period control signal; wherein
   the switching control module is coupled to the logic circuit to receive the logic signal, coupled to the first comparison circuit to receive the mode control signal, and coupled to the OFF time period control module to receive the first time period control signal, the second time period control signal and the third time period control signal, the switching control module is configured to provide the first switching control signal based on the logic signal, the mode control signal and the first time period control signal, provide the second switching control signal based on the logic signal, the mode control signal and the second time period control signal, and provide the third switching control signal and the fourth switching control signal based on the logic signal, the mode signal and the third time period control signal.

3. The control circuit of claim 2, wherein the switching control module further comprises:
   a frequency dividing circuit, configured to receive the logic signal, and configured to provide a first frequency dividing signal and a second frequency dividing signal via distribute pulses of the logic signal to the first frequency dividing signal and the second frequency dividing signal in turns;
   a first RS flip-flop, having a set terminal, a reset terminal and an output terminal, wherein the set terminal is coupled to the OFF time period control module to receive the first time period control signal, the reset terminal is coupled to the frequency dividing circuit to receive the first frequency dividing signal, and when the input voltage is higher than the system voltage, the first switching control signal is provided based on a signal at the output terminal of the first RS flip-flop;
   a second RS flip-flop, having a set terminal, a reset terminal and an output terminal, wherein the set terminal is coupled to the OFF time period control module to receive the second time period control signal, the reset terminal is coupled to the frequency dividing circuit to receive the second frequency dividing signal, and when the input voltage is higher than the system voltage, the second switching control signal is provided based on a signal at the output terminal of the second RS flip-flop; and
   a third RS flip-flop, having a set terminal, a reset terminal, a first output terminal and a second output terminal, wherein the set terminal is coupled to the OFF time period control module to receive the third time period control signal, the reset terminal is coupled to the logic circuit to receive the logic signal, and when the input voltage is lower than the system voltage, the third switching control signal is provided based on a signal at the first output terminal of the third RS flip-flop, and the fourth switching control signal is provided based on a signal at the second output terminal of the third RS flip-flop.

4. The control circuit of claim 2, wherein the OFF time period control module further comprises:
   an OFF time period generating circuit, having a first input terminal, a second input terminal, a first output terminal and a second output terminal, wherein the first input terminal is configured to receive the input voltage, the second input terminal is configured to receive the system voltage, the first output terminal is configured to provide the third time period control signal to control an OFF time period of the first switch being a first preset time period, and the second output terminal is configured to provide an OFF time period control signal to control an OFF time period of the first switching circuit and an OFF time period of the second switching circuit being a second preset time period; and a current balance control circuit, having a first input terminal, a second input terminal, a third input terminal, a first output terminal and a second output terminal, wherein the first input terminal is coupled to the OFF time period generating circuit to receive the OFF time period control signal, the second input terminal is configured to receive a first current feedback signal representative of a current flowing through the first switching circuit, the third input terminal is configured to receive a second current feedback signal representative of a current flowing through the second switching circuit, and based on the OFF time period control signal, the first current feedback signal and the second current feedback signal, the first output terminal of the current balance control circuit is configured to provide the first time period control signal to adjust the OFF time period of the first switching circuit and the second output terminal of the current balance control circuit is configured to provide the second time period control signal to adjust the OFF time period of the second switching circuit.

5. The control circuit of claim 2, wherein when a current flowing through the first switching circuit minus a current flowing through the second switching circuit is larger than a predetermined value, the first time period control signal is adjusted to extend an OFF time period of the first switching circuit, and the second time period control signal is adjusted to shorten an OFF time period of the second switching circuit.

6. The control circuit of claim 2, wherein when a current flowing through the second switching circuit minus a current flowing through the first switching circuit is larger than a predetermined value, the first time period control signal is adjusted to shorten an OFF time period of the first switching circuit, and the second time period control signal is adjusted to extend an OFF time period of the second switching circuit.

7. The control circuit of claim 1, wherein each of the feedback control loops further comprises:
an operating circuit, having a first input terminal, a second input terminal and an output terminal, wherein the first input terminal is configured to receive the feedback signal, the second input terminal is configured to receive the ramp signal, and the output terminal is configured to provide an operating signal based on the feedback signal and the ramp signal; and
a second comparison circuit, having a first input terminal, a second input terminal and an output terminal, wherein the first input terminal is configured to receive the operating signal, the second input terminal is configured to receive the reference signal, and the output terminal is configured to provide the loop control signal via comparing the operating signal with the reference signal.

8. The control circuit of claim 1, wherein the logic circuit further comprises an OR gate, the OR gate comprises a plurality of input terminals configured to receive the plurality of loop control signals, and an output terminal configured to provide the logic signal.

9. A battery charging circuit, comprising:
an input port, configured to receive an input voltage;
an output port, configured to provide a system voltage;
a first switching circuit comprising a first switch and a second switch, the first switching circuit is coupled between the input port and a node;
a second switching circuit comprising a third switch and a fourth switch, the second switching circuit is coupled in parallel with the first switching circuit between the input port and the node;
a fifth switch, having a first terminal, a second terminal and a control terminal, wherein the first terminal is coupled to the node, and the second terminal is coupled to a system ground;
a sixth switch, having a first terminal, a second terminal and a control terminal, wherein the first terminal is coupled to the node, and the second terminal is coupled to the output port; and
a control circuit, configured to receive a plurality of feedback signals and provide a first switching control signal to control the first switching circuit, a second switching control signal to control the second switching circuit, a third switching control signal to the control terminal of the fifth switch, and a fourth switching control signal to the control terminal of the sixth switch; wherein
when the input voltage is higher than the system voltage, the first switching circuit and the second switching circuit are controlled in response to the plurality of feedback signals, the fifth switch maintains OFF, and the sixth switch maintains ON; and
when the input voltage is lower than the system voltage, at least one of the first switching circuit and the second switching circuit maintains ON, and the fifth switch and the sixth switch are controlled in response to the plurality of feedback signals.

10. The battery charging circuit of claim 9, wherein
the first switch comprises a first terminal, a second terminal and a control terminal, wherein the first terminal is coupled to the input port, and the control terminal is configured to receive the first switching control signal;
the second switch comprises a first terminal and a second terminal, wherein the first terminal is coupled to the second terminal of the first switch, and the second terminal is coupled to the system ground; and
the first switching circuit further comprises a first inductor having a first terminal and a second terminal, wherein the first terminal is coupled to the second terminal of the first switch and the first terminal of the second switch, and the second terminal is coupled to the node.

11. The battery charging circuit of claim 9, wherein
the third switch comprises a first terminal, a second terminal and a control terminal, wherein the first terminal is coupled to the input port, and the control terminal is configured to receive the second switching control signal;
the fourth switch comprises a first terminal and a second terminal, wherein the first terminal is coupled to the second terminal of the third switch, and the second terminal is coupled to the system ground; and
the second switching circuit further comprises a second inductor having a first terminal and a second terminal, wherein the first terminal is coupled to the second terminal of the third switch and the first terminal of the fourth switch, and the second terminal is coupled to the node.

12. The battery charging circuit of claim 9, wherein the control circuit further comprises:
a plurality of feedback control loops, configured to provide a plurality of loop control signals, wherein each feedback control loop is configured to receive a reference signal, a feedback signal and a ramp signal, and provide a loop control signal based on the reference signal, the feedback signal and the ramp signal;
a logic circuit, configured to receive the plurality of loop control signals and provide a logic signal;
a first comparison circuit, having a first input terminal, a second input terminal and an output terminal, wherein the first input terminal is configured to receive the input voltage, the second input terminal is configured to receive the system voltage, and the output terminal is configured to provide a mode control signal via comparing the input voltage with the system voltage;
an OFF time period control module, configured to provide a first time period control signal, a second time period control signal, and a third time period control signal; and
a switching control module, coupled to the logic circuit to receive the logic signal, coupled to the first comparison circuit to receive the mode control signal, and coupled to the OFF time period control module to receive the first time period control signal, the second time period control signal, and the third time period control signal, and the switching control module is configured to provide the first switching control signal based on the logic signal, the first OFF time period control signal and the mode control signal, provide the second switching control signal based on the logic signal, the mode control signal and the second time period control signal, and provide the third switching control signal and the fourth switching control signal based on the logic signal, the mode signal and the third time period control signal.

13. The battery charging circuit of claim 12, wherein the switching control module further comprises:
a frequency dividing circuit, configured to receive the logic signal, and configured to provide a first frequency dividing signal and a second frequency dividing signal via distribute pulses of the logic signal to the first frequency dividing signal and the second frequency dividing signal in turns;
a first RS flip-flop, having a set terminal, a reset terminal and an output terminal, wherein the set terminal is coupled to the OFF time period control module to receive the first time period control signal, the reset terminal is coupled to the frequency dividing circuit to receive the first frequency dividing signal, and when the input voltage is higher than the system voltage, the first switching control signal is provided based on a signal at the output terminal of the first RS flip-flop;
a second RS flip-flop, having a set terminal, a reset terminal and an output terminal, wherein the set terminal is coupled to the OFF time period control module to receive the second time period control signal, the reset terminal is coupled to the frequency dividing circuit to receive the second frequency dividing signal, and when the input voltage is higher than the system voltage, the second switching control signal is provided based on a signal at the output terminal of the second RS flip-flop; and a third RS flip-flop, having a set terminal, a reset terminal, a first output terminal and a second output terminal, wherein the set terminal is coupled to the OFF time period control module to receive the third time period control signal, the reset terminal is coupled to the logic circuit to receive the logic signal, and when the input voltage is lower than the system voltage, the third switching control signal is provided based on a signal at the first output terminal of the third RS flip-flop, the fourth switching control signal is provided based on a signal at the second output terminal of the third RS flip-flop.

14. The battery charging circuit of claim 12, wherein the OFF time period control module is configured to provide the first OFF time period control signal and the second OFF time period control signal in response to an expected switching period of the first switching circuit, the input voltage, the system voltage, a current flowing through the first switching circuit, and a current flowing through the second switching circuit, and the OFF time period control module is configured to provide the third OFF time period control signal in response to an expected switching period of the fifth switch, the input voltage, and the system voltage.

15. The battery charging circuit of claim 9, wherein when a current flowing through the first switching circuit minus a current flowing through the second switching circuit is larger than a predetermined value, the first time period control signal is adjusted to extend an OFF time period of the first switching circuit, and the second time period control signal is adjusted to shorten an OFF time period of the second switching circuit.

16. The battery charging circuit of claim 9, wherein when a current flowing through the second switching circuit minus a current flowing through the first switching circuit is larger than a predetermined value, the first time period control signal is adjusted to shorten an OFF time period of the first switching circuit, and the second time period control signal is adjusted to extend an OFF time period of the second switching circuit.

17. A control method for a battery charging circuit, the battery charging circuit having an input port configured to receive an input voltage, an output port configured to provide a system voltage for charging a battery, a first switching circuit, a second switching circuit, a first switch and a second switch, wherein the first switching circuit and the second switching circuit are coupled in parallel between the input port and a node, the first switch is coupled between the node and a system ground, and the second switch is coupled between the node and the output port, the control method comprising:
providing an input current loop control signal based on an input current feedback signal representative of an input current of the battery charging circuit, a ramp signal and an input current reference signal;
providing a battery voltage loop control signal based on a battery voltage feedback signal representative of a battery voltage, the ramp signal and a battery voltage reference signal;
providing a charging current loop control signal based on a charging current feedback signal representative of a battery charging current, the ramp signal and a charging current reference signal;
providing a system voltage loop control signal based on a system voltage feedback signal representative of the system voltage, the ramp signal and a system voltage reference signal;

providing a logic signal based on the input current loop control signal, the battery voltage loop control signal, the charging current loop control signal, and the system voltage loop control signal;

providing a first time period control signal, a second time period control signal and a third time period control signal based on the input voltage and the system voltage; and providing a first switching control signal to control the first switching circuit, a second switching control signal to control the second switching circuit, a third switching control signal to control the first switch, and a fourth switching control signal to control the second switch; wherein when the input voltage is higher than the system voltage, the first switching circuit and the second switching circuit are controlled based on the logic signal, an OFF time period of the first switching circuit is adjusted based on the first time period control signal, and an OFF time period of the second switching circuit is adjusted based on the second time period control signal, the first switch maintains OFF, and the second switch maintains ON; and when the input voltage is lower than the system voltage, the first switch and the second switch are controlled based on the logic signal and the third time period control signal, and at least one of the first switching circuit and the second switching circuit maintains ON.

18. The control method of claim 17, further comprising:
when a current flowing through the first switching circuit minus a current flowing through the second switching circuit is larger than a predetermined value, the first time period control signal is adjusted to extend the OFF time period of the first switching circuit, and the second time period control signal is adjusted to shorten the OFF time period of the second switching circuit.

19. The control method of claim 17, further comprising:
when a current flowing through the second switching circuit minus a current flowing through the first switching circuit is larger than a predetermined value, the first time period control signal is adjusted to shorten the OFF time period of the first switching circuit, and the second time period control signal is adjusted to extend the OFF time period of the second switching circuit.

20. The control method of claim 17, further comprising:
when a summation of the input current feedback signal and the ramp signal is larger than the input current reference signal, a summation of the battery voltage feedback signal and the ramp signal is larger than the battery voltage reference signal, a summation of the charging current feedback signal and the ramp signal is larger than the charging current reference signal, or a summation of the system voltage feedback signal and the ramp signal is larger than the system voltage reference signal, the logic signal is configured to turn OFF one of the first switching circuit, the second switching circuit and the first switch.

* * * * *